United States Patent [19]

Yano

[11] Patent Number: 4,467,463
[45] Date of Patent: Aug. 21, 1984

[54] OPTICAL DEVICE FOR CONTROLLING A LIGHT BEAM

[75] Inventor: Hajime Yano, Tokyo, Japan

[73] Assignee: Sony Corporation, Tokyo, Japan

[21] Appl. No.: 369,668

[22] Filed: Apr. 19, 1982

[30] Foreign Application Priority Data

Apr. 27, 1981 [JP] Japan ............................. 56-63706

[51] Int. Cl.³ ............................................. G11B 7/00
[52] U.S. Cl. ...................................... 369/45; 369/44; 350/255
[58] Field of Search .................................. 369/44–46, 369/112; 358/342; 250/201, 202, 570, 234–236, 239; 350/252, 255, 518, DIG. 3

[56] References Cited

U.S. PATENT DOCUMENTS

| 4,135,083 | 1/1979 | Van Alen et al. ................ 250/201 |
| 4,135,206 | 1/1979 | Kleuters et al. ................. 369/112 X |
| 4,302,830 | 11/1981 | Hamaoka et al. ................ 369/44 X |
| 4,367,543 | 1/1983 | Araki et al. .......................... 369/45 |
| 4,408,313 | 10/1983 | Musha ................................. 369/45 |

Primary Examiner—Aristotelis M. Psitos
Attorney, Agent, or Firm—Lewis H. Eslinger; Alvin Sinderbrand

[57] ABSTRACT

An optical device for controlling a light beam, for example, in an optical disc player, has an optical element, such as, a lens, acting on a light beam and being carried by a movable member to which a bar magnet is also attached, and a magnet having a closed shape, for example, in the form of a ring, extends around the bar magnet so that the magnetic fields of the bar magnet and the ring-shaped magnet provide magnetic reactive forces tending to maintain the movable member and the lens thereon in a stable balanced position. Further, at least first and second electromagnets are selectively energized to interact with the bar magnet for causing respective movements of the movable member and lens in the direction of the optical axis of the lens for focusing the light beam at a record medium surface, and in a direction at right angles to the optical axis, for example, for varying the position on the record medium surface where the focused light beam impinges.

24 Claims, 11 Drawing Figures

OPTICAL DEVICE FOR CONTROLLING A LIGHT BEAM

BACKGROUND OF THE INVENTION

1. Field of the Invention

This invention relates generally to an optical device for controlling a light beam by means of an optical element, such as, a lens, and more particularly is directed to such a device which is capable of controlling movements of the optical element in two directions at right angles to each other so as to be particularly suited for use in an optical scanning assembly of an optical disc player or other apparatus in which a light beam is directed against a record medium surface for optically reading information recorded in a track on such surface.

2. Description of the Prior Art

It is known to provide an optical disc player with a focusing servo by which a light beam from a laser light source is correctly focused on a disc surface through an objective lens, and also with a tracking servo by which the point of impingement of the focused light beam on the disc surface is made to coincide with the track being scanned or read. In one known form of such optical disc player, for example, as disclosed in U.S. Pat. No. 4,135,083, an objective lens holder is supported by first and second sets of springs so that the objective lens can be moved, in response to electromagnetically applied forces, both in the axial direction for correcting focusing errors, and in a direction extending radially in respect to a track being scanned on a record disc for correcting tracking errors. However, the use of resilient plates or springs to support the objective lens holder, as aforesaid, gives rise to problems in that mechanical resonance of the springs or resilient plates occurs at a specific frequency and causes deterioration of either the focusing servo control or the tracking servo control. Furthermore, the use of a number of springs to support the objective lens results in a rather complex structure which is difficult to assemble and align.

OBJECTS AND SUMMARY OF THE INVENTION

Accordingly, it is an object of the present invention to provide an improved optical device for controlling a light beam, and which is free of the previously mentioned problems associated with the prior art.

More specifically, an object of the present invention is to provide an optical device for controlling a light beam by means of an optical element, such as, a lens, and in which the optical element is mounted for movement in two directions at right angles to each other without resorting to resilient plates or springs susceptible to mechanical resonance.

Another object is to provide an improved optical device for controlling a light beam, as aforesaid, and which is particularly suitable for use in an optical scanning assembly of an optical disc player.

In accordance with an aspect of this invention, an optical device for controlling a light beam comprises a movable member carrying an optical element, such as, a lens, acting on a light beam and being mounted on a supporting member for rectilinear and angular movements relative to the latter so as to effect first and second kinds of control of the light beam, for example, focusing servo and tracking servo, in response to the rectilinear and angular movements, respectively, a first magnet also carried by the movable member, and a second magnet fixed relative to the supporting member and being shaped and magnetized to provide a magnetic field which reacts with the magnetic field of the first magnet to yieldably retain the movable member, and the optical element carried thereby, in a stable balanced position relative to the supporting member.

Further, in accordance with a feature of the invention, the above mentioned first magnet carried by the movable member is a bar magnet which is magnetized in a longitudinal direction extending substantially radially in respect to the axis about which angular movements are effected, and the second magnet has a closed shape, for example, in the form of a circle, oval or rectangle, and extends around the bar magnet and is magnetized in a direction substantially parallel to the longitudinal direction of the bar magnet. For the purpose of selectively causing the rectilinear and angular movements of the movable member, first and second electromagnetic means are associated with the second magnet of closed shape and are selectively energized, for example, by suitable focusing and tracking errors signals, respectively.

The above, and other objects, features and advantages of the invention, will be apparent in the following detailed description of illustrative embodiments of the invention which is to be read in connection with the accompanying drawings, wherein the same reference numerals are employed to identify corresponding parts in the various views.

DESCRIPTION OF THE PREFERRED EMBODIMENTS

Figure 1:
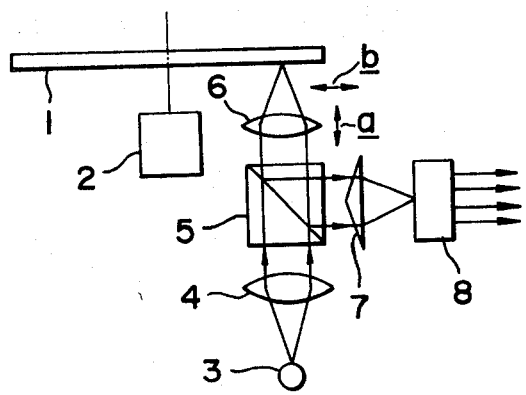
FIG. 1 is a schematic view showing an optical disc player with an optical scanning assembly or pick-up to which a device according to the present invention can be advantageously applied.

In order that the nature of this invention may be fully appreciated, an optical disc player of a type to which the invention may be advantageously applied will first be described with reference to FIG. 1. As there shown, a record medium in the form of an optical disc 1 has video, audio or other information signals recorded thereon in the form of an array of protrusions or pits along a track on the surface of disc 1 which is suitably rotated about its center at a constant linear velocity, as by a motor 2. In a typical optical disc, pits or recesses are formed in a reflective surface of the disc 1 along a spiral track with an average track pitch between successive turns of the spiral track, of, for example, 1.6 μm, and the reflective surface of the disc is covered with a transparent resin layer. A laser light beam is emitted by a laser 3 and is directed against the reflective surface of disc 1 through a collimating lens 4, a beam splitter 5 and an objective lens 6 which is intended to focus the light beam at the reflective surface. The light beam reflected by the reflective surface of disc 1, and having its energy modulated by the signal recorded in the track being scanned on record disc 1, is returned through objective lens 6 to beam splitter 5 which diverts the reflected light beam through a lens 7 to a light receiving device or transducer 8 comprised of a plurality of photo-diodes or the like. The photo-diodes in device 8 are arranged in a predetermined positional relationship to provide respective output signals in response to the reflected light beam applied thereto through lens 7. The output signals from such photo-diodes are supplied to an operational circuit (not shown) which, as is known, provides therefrom a reproduced information signal, a focusing error signal and a tracking error signal.

In the correctly focused condition, the laser light beam passing through objective lens 6 is focused thereby at the reflective surface on disc 1 in which the pits or recesses are formed and, in the correct tracking condition, the spot formed by the laser light beam on disc 1 is positioned precisely on the record track along which the pits or recesses are arrayed. However, in practice, deformation and/or eccentricity of disc 1, while being rotated, causes defocusing or mistracking of the laser light beam in respect to the disc. Accordingly, it is known to provide an optical disc player of the type illustrated schematically on FIG. 1 with a focusing servo control for moving the objective lens 6 in the direction of its optical axis, that is, perpendicular to the surface of disc 1, as indicated by the double-headed arrow a, in response to the previously mentioned focusing error signal so that the focus point of the laser beam is shifted, as required, to be again located at the reflective surface of the disc, and also with a tracking servo control for moving lens 6 in a direction parallel to the surface of disc 1, as indicated by the double-headed arrow b, in response to the tracking error signal so that the point of impingement of the laser light beam on disc 1 is restored to the record track being scanned. Movement of lens 6 in a direction parallel to the surface of disc 1 for effecting the tracking servo control is preferred over the provision of a pivoted mirror (not shown) located in the path of the laser light beam and being angularly displaced in response to the tracking error signal for moving the point of impingement of the laser light beam on the disc transversely in respect to the track being scanned. Such preference results from the fact that the addition of the pivotally mounted mirror relatively complicates the optical system and resists its being made compact. This is particularly a problem in providing an optical disc player for a PCM audio disc of smaller diameter.

Figure 2:
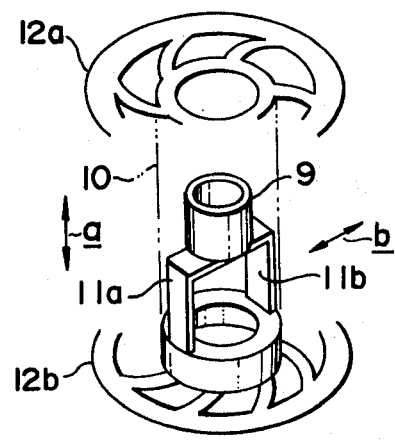
FIG. 2 is a schematic, partly exploded perspective view showing a previously proposed device for holding an objective lens in an optical disc player of the kind shown on FIG. 1.

Referring now to FIG. 2, it will be seen that, in accordance with the prior art, the objective lens 6 of the optical disc player of FIG. 1 may be supported for movement both in the direction of its optical axis and in a direction at right angles thereto, in a tubular lens holder 9 which is mounted on a cylindrical member 10 by means of a pair of diammetrically opposed axially diverted plate springs 11a and 11b which are parallel to each other and extend from cylindrical member 10. The cylindrical member 10 is, in turn, mounted relative to a support (not shown) by means of a pair of leaf or plate spring members 12a and 12b joined, at their inner peripheries, to cylindrical member 10 at axially spaced locations on the latter, and being further joined, at their outer peripheries, to the previously mentioned support. Thus, flexing of leaf or plate spring members 12a and 12b permits movement of lens holder 9 in the direction of double-headed arrow a, that is, in the direction of the optical axis of the objective lens contained in holder 9, by a suitably generated electromagnetic force in response to the focusing error signal, while springs 11a and 11b permit displacement or shifting of lens holder 9 in the direction at right angles to the optical axis of the objective lens contained therein, for example, in the direction indicated by the double-headed arrow b, by means of an electromagnetic force which is suitably generated in response to the tracking error signal. Although the arrangement indicated in FIG. 2 for mounting lens holder 9 avoids slanting of the optical axis of the objective lens in holder 9 relative to the path of the laser light beam therethrough when the objective lens is displaced in the direction of the arrow b for correcting a tracking error, such mounting arrangement, as previously mentioned, is disadvantageous in that the resilient plates or springs 11a, 11b, 12a and 12b are subjected to mechanical resonance at predetermined respective frequencies so that the focusing servo control and/or the tracking servo control is deteriorated thereby.

Figure 3A:
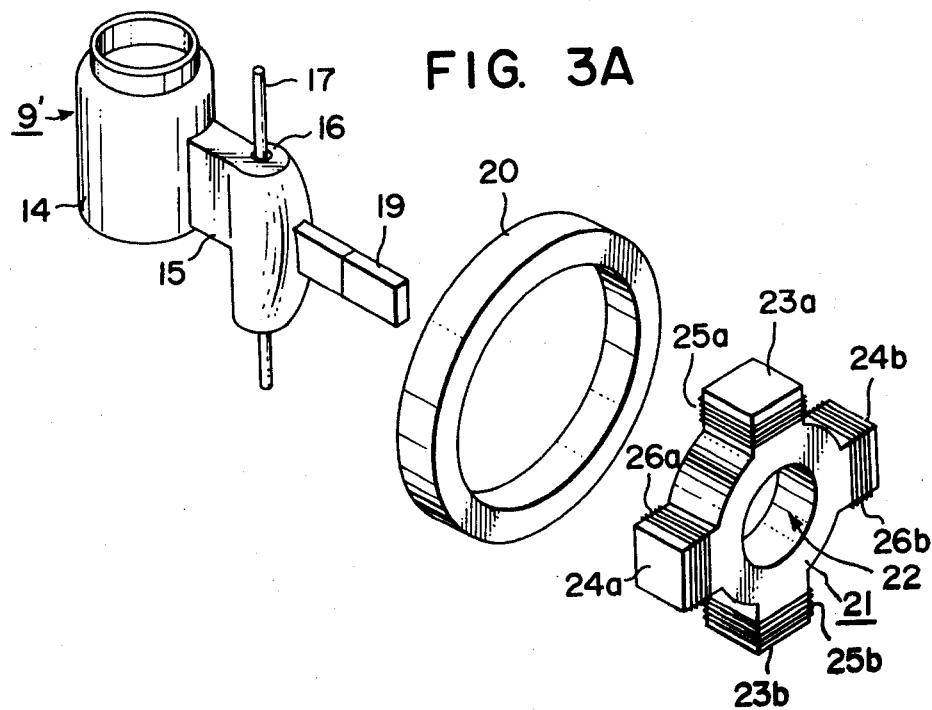
FIG. 3A is an exploded perspective view showing the main components of an optical device for controlling a light beam according to one embodiment of the present invention.
Figure 4:
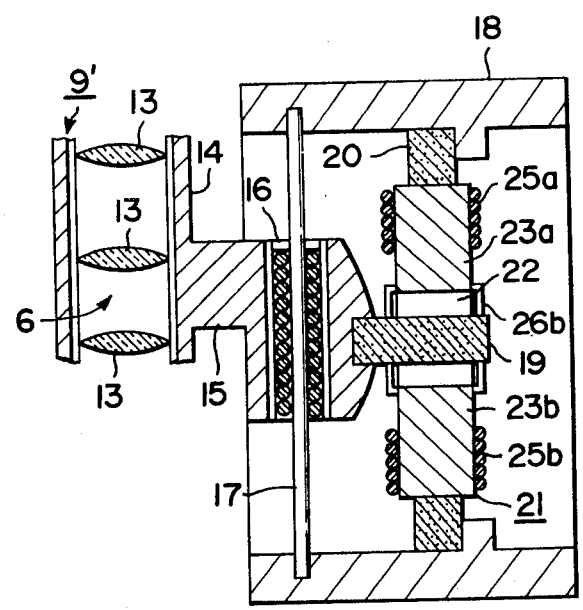
FIG. 4 is a vertical sectional view showing the device of FIG. 3A in its assembled condition.

Referring now to FIGS. 3A and 4, it will be seen that, in an optical device for controlling a light beam according to an embodiment of this invention, and which can be employed in an optical disc player of the type shown in FIG. 1 for controlling the focusing and tracking of the laser light beam, a lens holder 9' for the objective lens is constituted by an open-ended tubular member 14. A shown on FIG. 4, the objective lens 6 may be constituted by a plurality of lenses 13 held in member 14 and having a common optical axis. An arm 15 extends integrally from tubular member 14 and, at the end of arm 15 remote from tubular member 14, a ball bearing 16 is provided therein to receive a shaft 17 which has its longitudinal axis extending parallel to the axis of tubular member 14, and hence to the optical axis of objective lens 6. Shaft 17 is secured, at its opposite ends, in a supporting member 18 which is suitably mounted to dispose the axis of shaft 17 perpendicular to the plane of record disc 1 in FIG. 1 so that rectilinear movements of tubular member 14 parallel to the axis of support shaft 17 will vary the focus of the light beam acted on by lens 6, and angular movements of tubular member 14 and arm 15 about the axis of shaft 17 will be effective, for example, to displace the spot at which the laser light beam lands on disc 1 in the direction transverse to the track being scanned. Further, supporting member 18 may itself be mounted for gradual movement in the radial direction of record disc 1 so that, as record disc 1 is rotated, the optical scanning assembly or pick-up is progressively moved radially for causing the laser light beam to follow a spiral record track on the disc.

Figure 3B:
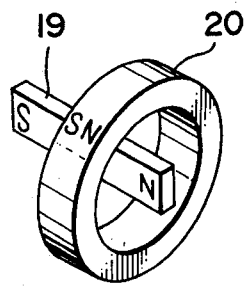
FIGS. 3B and 3C are perspective views showing details and relationships of certain components appearing on FIG. 3A.

A bar magnet 19 which is magnetized in its longitudinal direction, as shown particularly on FIG. 3B, extends from arm 15 radially in respect to the axis of shaft 17 at the side of the latter opposite to tubular member 14. Another magnet 20 having a closed shape, for example, being in the form of a circular ring, as shown on FIG. 3B, is fixed within supporting member 18 so as to extend around bar magnet 19, as shown on FIG. 4. The ring-shaped magnet 20 is magnetized parallel to its central axis, that is, in a direction substantially parallel to the longitudinal direction of bar magnet 19, as shown on FIG. 3B. As a result of the foregoing, the magnetic fields of magnets 19 and 20 react with each other to yieldably retain tubular member 14, and hence objective lens 6 therein, against rectilinear movements along, and angular movements about shaft 17 from a stable balanced position relative to supporting member 18 and in which bar magnet 19 is substantially centered within ring magnet 20.

Figure 3C:
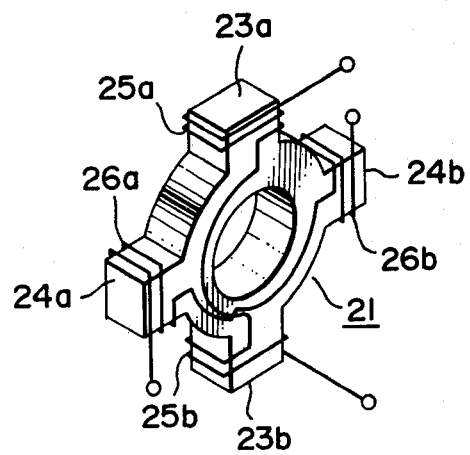

In order to effect rectilinear and angular movements of objective lens 6 along and about the axis of shaft 17, for example, for achieving focusing servo control and tracking servo control, respectively, the optical device according to this invention is further shown to include a bobbin 21 disposed within ring magnet 20 and suitably bonded to the latter. The bobbin 21 includes a ring portion having an opening 22 extending therethrough for loosely accommodating bar magnet 19, a pair of radial projections 23a and 23b extending vertically, that is, parallel to the axis of shaft 17, from diammetrically opposed locations on the ring portion, and another pair of projections 24a 24b extending horizontally, that is, at right angles to the axis of shaft 17, from the opposite sides of the ring portion of bobbin 21, as shown on FIGS. 3A and 3C. A pair of coils 25a and 25b are wound on the vertically directed projections 23a and 23b, respectively, and a pair of coil 26a and 26b are wound on the horizontally directed projections 24a and 24b, respectively. The coils 25a and 25b are connected in series and have their respective windings arranged, as shown in FIG. 3C, so that, when a vertical control current is supplied to coils 25a and 25b, in series, they establish magnetic flux in the same direction to affect the position of bar magnet 19 within central opening 22. The coils 26a and 26b are similarly shown to be connected in series and have their respective windings arranged so that, when a horizontal control current is supplied to coils 26a and 26b, the latter produce magnetic flux in the same direction for again affecting the position of bar magnet 19 within central opening 22. Of course, such opening 22 is large enough to accommodate the movements of bar magnet 19 corresponding to the desired movements of objective lens 6 for focusing and tracking corrections.

As earlier noted, when neither a vertical control current nor a horizontal control current is supplied to the coils 25a and 25b or to the coils 26a and 26b, respectively, bar magnet 19 is stably positioned substantially at the center or ring magnet 20. However, when a vertical control current is supplied to coils 25a and 25b, or a horizontal control current is supplied to coils 26a and 26b, bar magnet 19 is displaced from the center of ring magnet 20 in a direction, and to an extent determined by the polarity and amplitude, respectively, of the vertical or horizontal control current thus supplied. Lens holder 9' and the objective lens 6 therein are, of course, moved in correspondence with the movement of bar magnet 19 in response to the vertical or horizontal control current. Accordingly, when the embodiment of the invention described with reference to FIGS. 3A, 3B, 3C and 4 is applied to the optical disc player of FIG. 1, focusing servo control can be effected by controlling the position of lens holder 9' in the vertical direction, that is, in the rectilinear direction along the axis of shaft 17, while tracking servo control is effected by contolling the position of lens holder 9' in the horizontal direction, that is, in the direction of the angular displacements of lens holder 9' about the axis of shaft 17.

If the weight of the assembly movable along shaft 17, that is, the combined weight of objective lens 6, tubular member 14, arm 15, bearing 16 and bar magnet 19, is greater than the magnetic reactive force between bar magnet 19 and ring magnet 20, bar magnet 19 tends to be balanced at a position below the center of ring magnet 20 when neither a vertical control current nor a horizontal control current is supplied. In such case, an appropriate bias current may be continuously supplied to vertical coils 25a and 25b so as to reestablish the balanced position of bar magnet 19 at the center of ring magnet 20.

Although shaft 17 has been described as being mounted with its axis extending in the vertical direction, the optical device according to this invention may be arranged with shaft 17 extending in the horizontal direction, for example, for use in an optical disc player in which the record disc being scanned is rotatable in a vertical plane about a horizontal axis. In that case, a bias current may be supplied to horizontal coils 26a and 26b for establishing the stable balanced position of bar magnet 19 substantially at the center of ring magnet 20.

Figure 5:
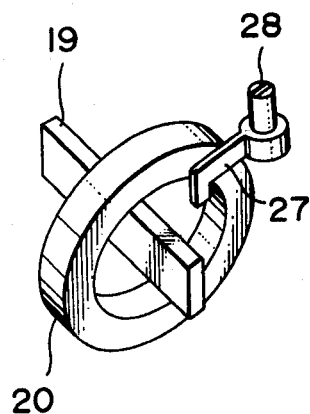
FIG. 5 is a schematic perspective view illustrating a modification of the embodiment of the invention shown on FIGS. 3A, 3B, 3C and 4.

Further, as shown in FIG. 5, the stable balanced position of bar magnet 19, at a time when neither a vertical nor a horizontal control current is supplied to the respective coils, may be adjusted by means of a field adjusting element 27, of iron or other magnetic material, pivotally mounted adjacent ring magnet 20 on an adjusting screw 28. It will be appreciated that the location of member 27 relative to ring magnet 20 can be varied by turning adjusting screw 28 so as to vary the distribution of magnetic flux provided by ring magnet 20, and thereby correspondingly vary the stable balanced position of bar magnet 29 within ring magnet 20.

In the embodiment of the invention described above with reference to FIGS. 3A and 4, tubular member 14 containing objective lens 6 and bar magnet 19 are respectively disposed at opposite sides of the axis of shaft 17 around which are effected the movements of angular lens 6 at right angles to its optical axis. Such arrangement is advantageous in that the weight of bar magnet 19 may substantially balance effect of the combined weight of tubular member 14 and objective lens 6 about ball bearing 16 movable along shaft 17. Further, bar magnet 19 may be disposed relatively close to bearing 16 with the result that the assembly of lens holder 9' for objective lens 6 and bar magnet 19 can be moved relatively smoothly in the vertical direction along shaft 17 in response to the supplying of a vertical control current to coils 25a and 25b. However, other arrangements of bar magnet 19 relative to tubular member 14 of lens holder 9' can be provided.

Figure 6A:
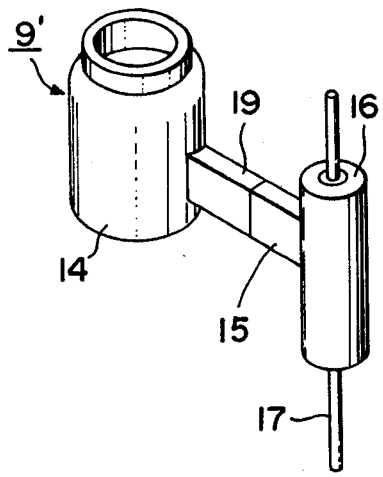
FIGS. 6A and 6B are schematic perspective views illustrating portions of optical devices for controlling light beams in accordance with other respective embodiments of the present invention.
Figure 6B:
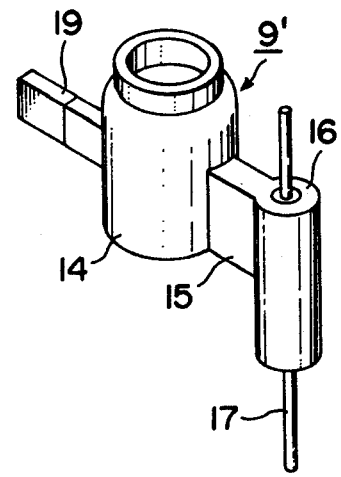

For example, as shown on FIGS. 6A and 6B, both tubular member 14 of lens holder 9' and bar magnet 19 may be provided at the same side of shaft 17. More particularly, the bar magnet 19 may be interposed between tubular member 14 of lens holder 9' and the arm 15 extending radially from ball bearing 16 which is movable axially along shaft 17 and angularly about the latter (FIG. 6A). Alternatively, tubular member 14 of lens holder 9' may be connected by radial arm 15 to bearing 16 movable along and about shaft 17, and bar magnet 19 may extend from tubular member 14 at the side of the latter opposed to arm 15 (FIG. 6B). Of course, it will be understood that in the embodiments of FIGS. 6A and 6B, respectively, the structures there shown are to be associated with a ring magnet 20 and a bobbin 21 with coils thereon substantially as shown on FIG. 3A, but with such ring magnet 20 and bobbin 21 being disposed, in each case, so as to extend around the respective bar magnet 19.

It will be further appreciated that, in each of the embodiments of FIGS. 6A and 6B, ball bearing 16 is provided at one end of the structure which is movable vertically along shaft 17 and also angularly displaceable about the axis of the latter. By reason of the foregoing, in each of FIGS. 6A and 6B, electromagnetically induced horizontal movements of bar magnet 19, for example, in response to the supplying of a horizontal control current to coils 26a and 26b, are transmitted directly to tubular member 14 of lens holder 9', rather than being transmitted through bearing 16 as in the embodiment of FIGS. 3A and 4. Therefore, in FIGS. 6A and 6B, the horizontal displacements of objective lens 6 in lens holder 9' are substantially shielded from the effects of mechanical resonance due to ball bearing 16. Particularly, in the case of the embodiment shown on FIG. 6A, the distance between tubular member 14 of lens holder 9' and ball bearing 16 can be increased for reducing jitters in the horizontal movement of objective lens 6 in tubular member 14 in response to the tracking servo control or other source of the horizontal control current. Further, since the tubular member 14 of lens holder 9' is positioned at one end of the structure which has bearing 16 at its opposite end in the embodiment of FIG. 6A, the lowest resonant frequency for horizontal movement of the objective lens 6 is decreased desirably. Also, in the embodiment of FIG. 6A, the horizontal movement of tubular member 14 of lens holder 9' is magnified relative to the horizontal movement of bar magnet 19 so that the requisite horizontal movements of objective lens 6 for tracking servo control or the like can be achieved with a relatively reduced horizontal movement of bar magnet 19 so as to obtain superior linearity in the tracking servo control.

Figure 7A:
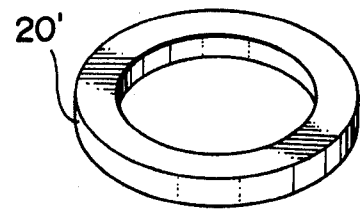
FIGS. 7A and 7B are perspective views illustrating modifications of an element of the optical device for controlling a light beam in accordance with additional embodiments of this invention.
Figure 7B:
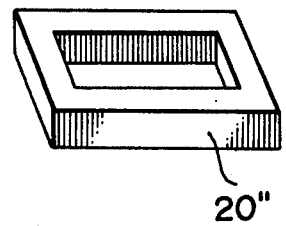

Although the bearing 16 for mounting the lens holder 9' on shaft 17 has been described above as preferably being a ball bearing, it will be understood that a suitable slide bearing may be employed in place of ball bearing 16. Furthermore, in the previously described embodiments of the invention, it has been stated that magnet 20 is in the form of a circular ring. However, it will be noted that such magnet fixed within supporting member 18 may have other closed shapes. For example, ring magnet 20 may be replaced by an oval magnet 20' (FIG. 7A), or by a rectangular loop magnet 20" (FIG. 7B), or the like. In such devices according to this invention employing a fixed magnet of a closed shape other than a circle, the distribution of the magnetic flux in the area surrounded by the magnet of closed non-circular shape and which acts on bar magnet 19 will have different distributions in the vertical and horizontal directions, respectively. Thus, the sensitivity of the vertical movement, for example, in response to a focusing error signal, can be made different from the sensitivity of the movement in the horizontal direction, for example, in response to a tracking error signal, with the result that cross talk between the vertical magnetic flux and the horizontal magnetic flux can be reduced. Further, although bar magnet 19 has been shown to be of rectangular cross-sectional configuration, the cross-section of bar magnet 19 may be otherwise shaped, for example, may be circular, oval or otherwise polygonal, so as to provide various selected characteristics in combination with the ring magnet 20 or other magnet of closed shape substituted therefor.

It will be apparent from the above that, in optical devices for controlling a light beam according to the present invention, no mechanical springs are used for mounting the optical element or lens 6 acting on the light beam so as to permit movements of such optical element in two different directions from a neutral position. Rather, in accordance with the present invention, a magnetic reactive force is utilized to yieldably maintain the optical element or lens 6 in a predetermined stable or balanced position from which the lens 6 may be displaced in two right angularly related directions by respective electromagnetically generated forces. Thus, the optical devices according to this invention avoid the undesirable consequences of the mechanical resonances that arise when springs are used for similarly supporting the objective lens 6. Moreover, in eliminating such supporting springs, the devices according to this invention employ a reduced number of parts so as to simplify the devices and permit the miniaturization and reduction in weight thereof. Further, the use of the moving bar magnet 19 in devices according to the invention for effecting movements of the optical element or lens 6 makes it possible to improve the sensitivity of such movements to respective focusing or tracking control signals without increasing the weight of the device. Finally, in devices according to this invention, the optical axis of the lens 6 is maintained precisely parallel to the axis of the support shaft 17, particularly when bearing 16 movable thereon is a ball bearing, with the result that relatively higher accuracies can be attained for the focusing servo control and the tracking servo control.

Although the angular displacements about the axis of shaft 17 have been described above as being for the purpose of correcting tracking errors by moving the spot at which the focused laser light beam impinges on record disc 1 in the direction transverse to the record track being scanned, it is apparent that supporting member 18 could be oriented so that the angular displacements or horizontal movements of objective lens 6 about the axis of shaft 17 cause the point of impingement of the focused light beam on record disc 1 to move in the direction along the record track, whereby to correct for time base errors.

While illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An optical device for controlling a light beam, comprising:
   a supporting member;
   a movable member mounted on said supporting member for rectilinear and angular movements relative to the latter
   an optical element carried by said movable member and acting on a light beam for effecting first and second kinds of control of said light beam in response to said rectilinear and angular movements, respectively;

a first magnet also carried by said movable member; and a second magnet fixed relative to said supporting member and being shaped and magnetized to provide a magnetic field which reacts with said first magnet to yieldably retain said movable member, and said optical element carried thereby, against said rectilinear and angular movements from a stable balanced position relative to said supporting member said angular movements are about an axis fixed relative to said supporting member and said rectilinear movements are parallel to said axis, said first magnet is a bar magnet which magnetized in a longitudinal direction extending substantially radially in respect to said axis, and said second magnet has a closed shape extending around said bar magnet and is magnetized in a direction substantially parallel to said longitudinal direction of the bar magnet.

2. An optical device according to claim 1; in which said angular movements are about an axis fixed relative to said supporting member and said rectilinear movements are parallel to said axis, said first magnet is a bar magnet which is magnetized in a longitudinal direction extending substantially radially in respect to said axis, and said second magnet has a closed shape extending around said bar magnet and is magnetized in a direction substantially parallel to said longitudinal direction of the bar magnet.

3. An optical device according to claim 2; further comprising a magnetic element adjustably movable into said magnetic field of said second magnet for varying the flux distribution in said field and thereby adjusting said stable balanced position of said movable member and of said optical element carried thereby.

4. An optical device according to claim 3; further comprising first and second electromagnetic means operative to cause said rectilinear and angular movements, respectively, of said movable member.

5. An optical device according to claim 2; further comprising first and second electromagnetic means operative to cause said rectilinear and angular movements, respectively, of said movable member.

6. An optical device according to claim 5; in which said optical element is an objective lens assembly having an optical axis parallel to, and offset from said axis of the angular movements and through which said light beam passes in the direction of said optical axis so that said rectilinear movements can vary the focus of said light beam at a surface and said angular movements can vary the position on said surface at which the focused light beam impinges.

7. An optical device according to claim 2; in which said closed shape of the second magnet is a circle.

8. An optical device according to claim 2; in which said closed shape of the second magnet is an oval.

9. An optical device according to claim 2; in which said closed shape of the second magnet is a rectangle.

10. An optical device according to claim 2; in which said optical element and said first magnet are at opposite sides of said axis about which said angular movements occur.

11. An optical device according to claim 2; in which said optical element and said first magnet are both disposed at one side of said axis about which the angular movements occur.

12. An optical device according to claim 11; in which said first magnet is between said optical element and said axis.

13. An optical device according to claim 11; in which said optical element is between said first magnet and said axis.

14. An optical device according to claim 2; further comprising a bobbin located within said closed shape of the second magnet and having a central opening in which said bar magnet extends with substantial clearance therebetween, said bobbin having a first pair of projections extending generally parallel to said axis and a second pair of projections extending generally at right angles to said axis; first coils on said first projections adapted to receive an electrical current for causing said rectilinear movements of said movable member; and second coils on said second projections adapted to receive an electric current for causing said angular movements.

15. In an apparatus directing a light beam against a record medium surface for optically reading information recorded in a track on such surface; an optical scanning assembly comprising lens means interposed in the path of said light beam and having an optical axis substantially coinciding with said path, a supporting member having means thereon defining a support axis, a movable member mounted on said support axis for rectilinear movements along the latter and for angular movements about said support axis, said lens means being carried by said movable member with said optical axis substantially parallel to, and offset from said support axis so that said rectilinear movements vary the focus of said light beam at said surface and said angular movements vary the position on said surface at which the focused light beam impinges, a first magnet in the shape of a bar carried by said movable member and being magnetized in a longitudinal direction extending substantially radially in respect to said support axis, a second magnet fixed relative to said supporting member and having a closed shape extending around said first magnet, said second magnet being magnetized in a direction substantially parallel to said longitudinal direction in which said first magnet is magnetized to provide a magnetic field which reacts with the magnetic field of the first magnet for yieldably resisting said rectilinear and angular movements of said movable member, and said lens means carried thereby, from a stable balanced position relative to said supporting member, and first and second electromagnetic means selectively operative to cause said rectilinear and angular movements, respectively, of said movable member.

16. An apparatus according to claim 15; further comprising a magnetic element adjustably movable into said magnetic field of said second magnet for varying the flux distribution in said field thereof and thereby adjusting said stable balanced position of said movable member and of said lens means carried thereby.

17. An apparatus according to claim 15; in which said closed shape of the second magnet is a circle.

18. An apparatus according to claim 15; in which said closed shape of the second magnet is an oval.

19. An apparatus according to claim 15; in which said closed shape of the second magnet is a rectangle.

20. An apparatus according to claim 15; in which said lens means and said first magnet are at opposite sides of said support axis about which said angular movements occur.

21. An apparatus according to claim 15; in which said lens means and said first magnet are both disposed at one side of said support axis about which the angular movements occur.

22. An apparatus according to claim 21; in which said first magnet is between said lens means and said support axis.

23. An apparatus according to claim 21; in which said lens means is between said first magnet and said support axis.

24. An apparatus according to claim 15; further comprising a bobbin located within said closed shape of the second magnet and having a central opening in which said bar shaped magnet extends with substantial clearance therebetween, said bobbin including around said central opening a first pair of projections extending generally parallel to said support axis and a second pair of projections extending generally at right angles to said support axis, and in which said first and second electromagnetic means includes first coils on said first projections adapted to receive an electrical current for causing said rectilinear movements of said movable member, and second coils on said second projections adapted to receive an electric current for causing said angular movements.

* * * * *